April 29, 1930. W. E. SLOAN 1,756,263
FLUSH VALVE
Filed April 9, 1927
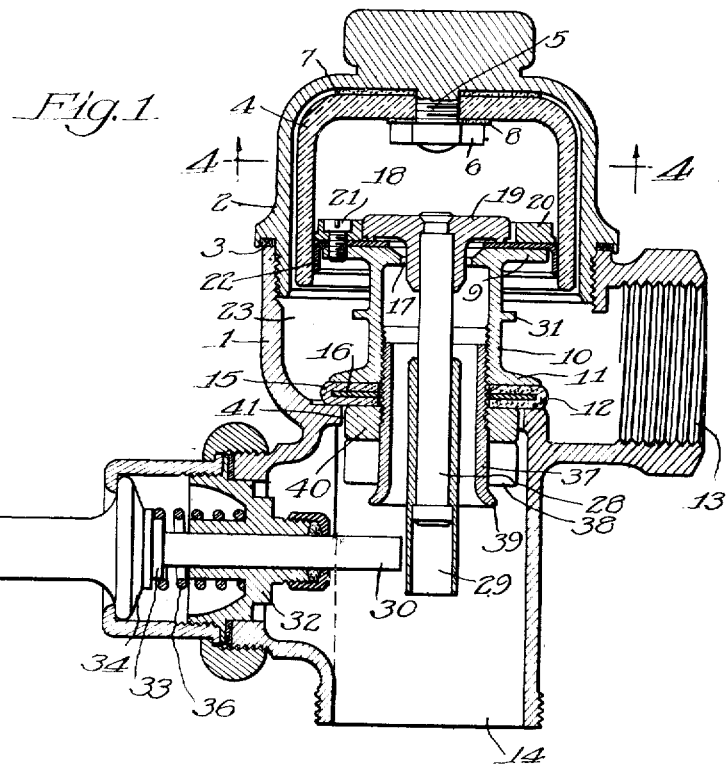
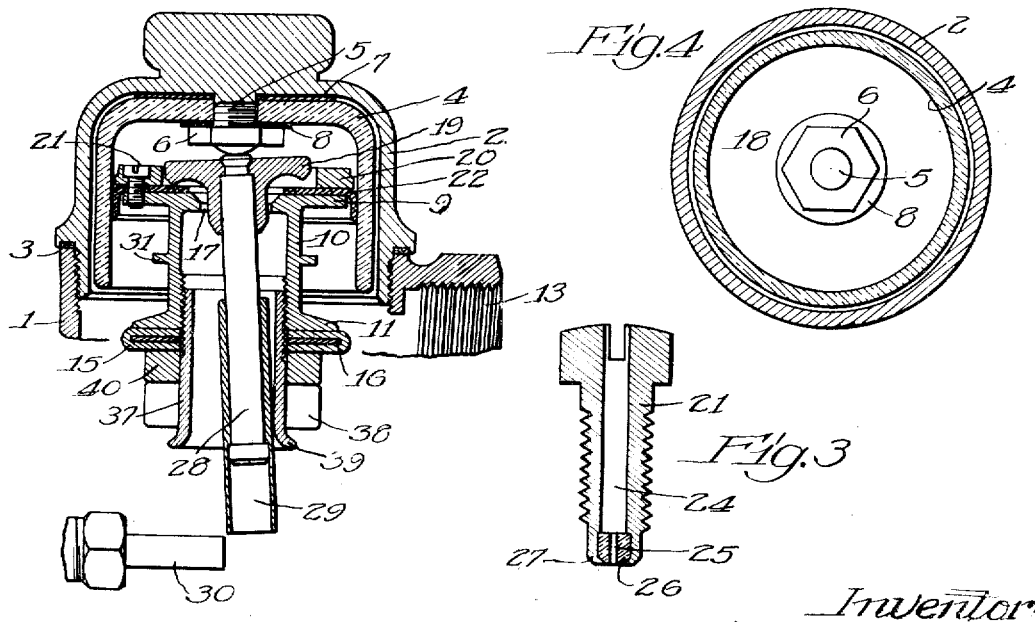
Inventor
William E. Sloan
By Parker + Carter Attys.

Patented Apr. 29, 1930

1,756,263

UNITED STATES PATENT OFFICE

WILLIAM E. SLOAN, OF CHICAGO, ILLINOIS

FLUSH VALVE

Application filed April 9, 1927. Serial No. 182,518.

This invention relates to flush valves and has for its object to provide a new and improved device of this description.

The invention has, as a further object, to provide a flush valve which is simple and inexpensive in construction with comparatively few parts, which are easily accessible for inspection, cleaning and repairing and which will give long service.

The invention has, as a further object, to provide a flush valve which closes automatically irrespective of any action on the part of the operator after it has been once started in operation.

The invention has other objects which are more particularly pointed out in the accompanying description.

Referring to the drawings:

Fig. 1 is a sectional view through one form of valve embodying the invention.

Fig. 2 is a view similar to Fig. 1, with parts omitted, showing the movable parts of the valve in a different position.

Fig. 3 is an enlarged sectional view showing the construction of the by pass.

Fig. 4 is a sectional view taken on line 4—4 of Fig. 1.

Like numerals refer to like parts throughout the several figures.

Referring now to the drawings:

I have illustrated a flush valve having a casing having two sections, 1 and 2, removably connected together with a packing 3 between them. Located within the casing is a lining 4 of nonmetallic material such as vitreous material. This lining is removably connected to the casing in any desired manner. As herein shown, the lining is provided with an opening into which fits a projection 5 connected with the casing. A holding piece 6 connected with the projection 5 holds the parts in position.

Washers 7 and 8, preferably of some yielding material, are placed between the metal parts and the lining 4. The lining is preferably separated from the casing by a space. Connected to the piston 9 by a cylindrical part 10 is a valve member 11 which co-operates with the seat 12. This valve member, therefore, controls the passageway of the water from the inlet 13 to the outlet or discharge 14. The valve member 11 is provided with a reversible packing 15 reinforced with a metal ring 16. The piston 9 is provided with an opening 17 which connects the chamber 18 above the piston, with the outlet or discharge 14. The opening 17 is controlled by an auxiliary valve 19 which fits into an opening in a plate 20 which is fastened to the piston by fastening devices such as screws 21. A packing piece 22 for the piston is held between the plate 20 and the piston 9 and has a portion which projects beyond the plate 20 so as to act as a packing for the auxiliary valve 19. Some means is provided for permitting water from the chamber 23, on one side of the piston, to enter the chamber 18 on the other side of the piston so as to cause the piston to return and remain in its initial position until the pressure in the chamber 18 is released by the opening of the auxiliary valve 19.

In the construction shown, this connection or passageway 24 is provided in one of the screws 21, (see Fig. 3). In order to insure against the by-pass being stopped or obstructed by foreign material, the inlet opening 25 is made smaller than the main body of the passageway 24 so that any foreign material that passes through the inlet can be easily discharged through the enlarged main body of the passageway.

I prefer to have the inlet opening 25 formed in an end piece 26 made of some nonmetallic material, such as vitreous material. Such material is highly resistant to chemical and electrolytic action, and the admission opening remains constant in size during the period the valve is in service. The passageway 24 is enlarged at the end to receive the end piece 26 and the material of the screw bent at 27 so as to hold the end piece in position.

The auxiliary valve 19 is actuated from the exterior of the casing in some suitable way. In the construction shown, the auxiliary valve is provided with a stem consisting of two telescoping members 28 and 29. The valve is opened by means of an actuating part 30 which engages the stem and moves the valve to its open position. This permits the escape of water from chamber 18 and the pressure of the water, in chamber 23 moves the piston 9 upwardly and opens the valve member 11. The movement of the piston 9 carries the auxiliary valve with it and when it reaches the top of the casing, if the auxiliary valve has not closed, said auxiliary valve will strike a closing part which, in this instance is shown as the projection 5, and be closed thereby. It sometimes happens that if there is air in the chamber 18, as for example, when the valve has been newly connected, or has been drained out for any purpose, the auxiliary valve does not close until it is closed by the closing part or projection 5.

When the chamber 18 contains water only, the auxiliary valve 19 is closed by the water pressure, assisted by gravity so as to insure its proper seating before it strikes the projection 5. In assembling the parts, the screw 21, having the by pass opening through it, may be located in various positions with relation to the inlet 13, as there is no means for always having it in the same position. I have found that the water passing through the flush valve at each operation, varies according to the position of the by-pass opening under ordinary conditions.

When the by-pass opening is near the inlet 13, a larger quantity of water passes through the flush valve, the quantity decreasing as the by pass is placed farther from the inlet opening. This variation in the quantity of water passing through the flush valve, at each operation, is due to the variation in the length of time required to refill the empty portion of the chamber 18. Some means should, therefore, be provided for preventing this and for equalizing this time regardless of the position of the by-pass with relation to the inlet.

I have illustrated one construction for that purpose which consists of a lateral projection 31 on the cylindrical part 10. When the valve member 11 is opened, the water rushes through the opening, at all points around the valve member 11, and forms currents in the chamber 23, such currents extending around the part 10 and longitudinally therealong. Without the laterally projecting part 31, or some equivalent arrangement, these currents interfere with the passage of the water from the chamber 23 through the by-pass, to the chamber 18, the passage of such water being at a slower rate when the by-pass is near the inlet 13, than when it is farther away from such inlet. The laterally projecting part 31 breaks up these currents, or so influences the flow of water, that the flow of the water through the by-pass from chamber 23 to chamber 18 is substantially independent of the position of said by-pass with relation to the inlet 13. This laterally projecting part 31, therefore, acts as a means for securing a substantially uniform flow of water through the by-pass regardless of its position.

The actuating part 30 may be moved by any desired means to open the valve 19. As herein shown, it is mounted to reciprocate in a holding member 32 and is provided with an enlarged end 33 which is engaged by the end 34 of the handle 35. When the handle 35 is moved in any direction, the actuating part 30 will be moved toward the stem of the valve 19 so as to engage it and move it to open the valve. The actuating part 30 is returned to its initial position when the handle is released by the retracting spring 36.

Connected with the piston 9 is a cylinder 37 which is provided with laterally projecting guide members 38 which engage the wall of the outlet 14 as the piston moves up and down. This cylinder has a flared end 39 which tends to direct the water flow through the flush valve away from the part 29 of the valve stem so as not to interfere with the seating of said auxiliary valve. This flared construction also tends to help seat the valve member. The cylinder 37 further acts to keep the currents away from the part 29 of the auxiliary valve stem. This cylinder has connected therewith, a member in the form of a ring 40 which acts to control the flow of the water through the valve as the valve member is moved to its seat.

This ring is smaller in diameter than the opening controlled by the valve member 11 and, as it moves down past the seat 12, there is still a portion 41 of the discharge opening, left open for the water so that a small amount of water will pass by the valve member 15 until it engages its seat. This ring controls the time and amount of the refill, and the time and amount of the refill may be regulated by varying the size of this ring.

The use and operation of my invention are as follows:

When the flush valve is in use, the parts are in the position indicated in Fig. 1. When it is desired to operate the valve, the handle 35 is moved in any direction. This moves the actuating part 30 against the part 29 and opens the valve 19. Water now escapes from chamber 18 through the opening 17 and passes out the tube 14. The pressure in chamber 23 then moves the piston 9 upwardly, moving the valve member 11 from its seat so as to open the valve.

If the valve has been in operation so that the chamber 18 is filled with water, the pressure of the water and the force of gravity will cause the auxiliary valve 19 to close after the piston is moved upwardly the proper distance. Water then passes from chamber 23 to chamber 18 through the by-pass passageway 24 and builds up the pressure in the chamber 18 so that the piston 9 is moved downwardly and the valve member 11 moved to its seat. If the handle 35 is held in its operative position, the actuating part 30 will be under the part 29 but will not interfere with the closing of the valve, as the part 29 will rest on the top of the handle and slide along the part 28, thus permitting the valve to close without interference.

If the valve has just been installed or has been drained out, for any reason, there will be air in the chamber 18 and, in that event, the auxiliary valve 19 may remain open until the piston 9 moves upwardly far enough to cause the auxiliary valve to engage the projection 5 and be closed thereby. In such event, the piston 9 will move up farther than in the case where the valve has been operating and the chamber 18 is free from air. The equalizing device 31 will substantially equalize the flow of the water through the by-pass regardless of its position with relation to the inlet 13. The lining 4 does not rust, does not receive deposits and is not acted upon chemically or electrolytically and, therefore, provides a smooth, clean surface for the piston, at all times throughout the life of the valve, and, therefore, insures the proper and accurate working of the valve.

The valve has but few parts, all of which are easily accessible, and the valve is inexpensive to manufacture and will give long, continuous and satisfactory service.

The by-pass may be secured by flattening one of the associated parts so that there will be a space between the two parts to permit the flow of the desired amount of water.

I claim:

1. A flush valve comprising a casing, a piston in said casing dividing it into an upper and a lower chamber, a valve member connected with said piston and located in the lower chamber, a seat co-operating with said valve member, a nonmetallic lining in said upper chamber which engages said piston and acts as a guide therefor, said non-metallic lining open at one end and closed at the other end, and means for relieving the pressure in said upper chamber when it is desired to operate the valve.

2. A flush valve comprising a casing, a piston in said casing dividing it into an upper and a lower chamber, a valve member connected with said piston and located in the lower chamber, a seat co-operating with said valve member, a vitreous lining in said upper chamber which engages said piston and acts as a guide therefor, said vitreous lining open at one end and closed at the other end, a holding piece connected with said casing and engaging the closed end of said vitreous lining, and means for relieving the pressure in said upper chamber when it is desired to operate the valve.

3. A flush valve comprising a casing, a piston in said casing dividing it into two chambers, an upper chamber and a lower chamber, and a cylindrical part smaller in diameter than said piston and projecting downwardly therefrom, a valve seat within said casing upon which the lower end of said cylinder rests when the valve is closed and which limits the downward movement of said valve, said piston being provided with a discharge opening through which water from the upper chamber is discharged, an auxiliary valve controlling said opening, a recess in said piston in which said auxiliary valve is received, a packing for said piston the outer edge of which is bent downwardly and projects below the piston and which extends part way across said recess and acts also as a packing for said auxiliary valve, and means for actuating said auxiliary valve when it is desired to operate the flush valve.

4. A flush valve comprising a casing, a piston in said casing dividing it into an upper and a lower chamber, a valve member connected with said piston, a seat co-operating with said valve, a removable part connected with said piston, having its central portion removed to provide a recess, a packing for said piston located between the piston and said removable piece, said packing projecting part way across the recess in said removable piece, a fastening device for securing said removable part, packing and piston together, said fastening device provided with an opening which connects the upper and lower chambers, an auxiliary valve located in the recess in said removable piece and engaging said packing, and means for moving said auxiliary valve when it is desired to actuate the flush valve.

5. A flush valve comprising a casing, having an admission and a discharge opening, a piston in said casing dividing it into an upper and a lower chamber, a valve member connected with said piston, a valve seat co-operating with said valve member, a by-pass extending through said piston, means for discharging the water from the upper chamber when it is desired to actuate the flush valve and means for equalizing the flow of water through said by-pass in all its various positions with relation to said admission opening during each cycle of operation of the flush valve.

Signed at Chicago, county of Cook and State of Illinois, this seventh day of April, 1927.

WILLIAM E. SLOAN.